Figure 1:
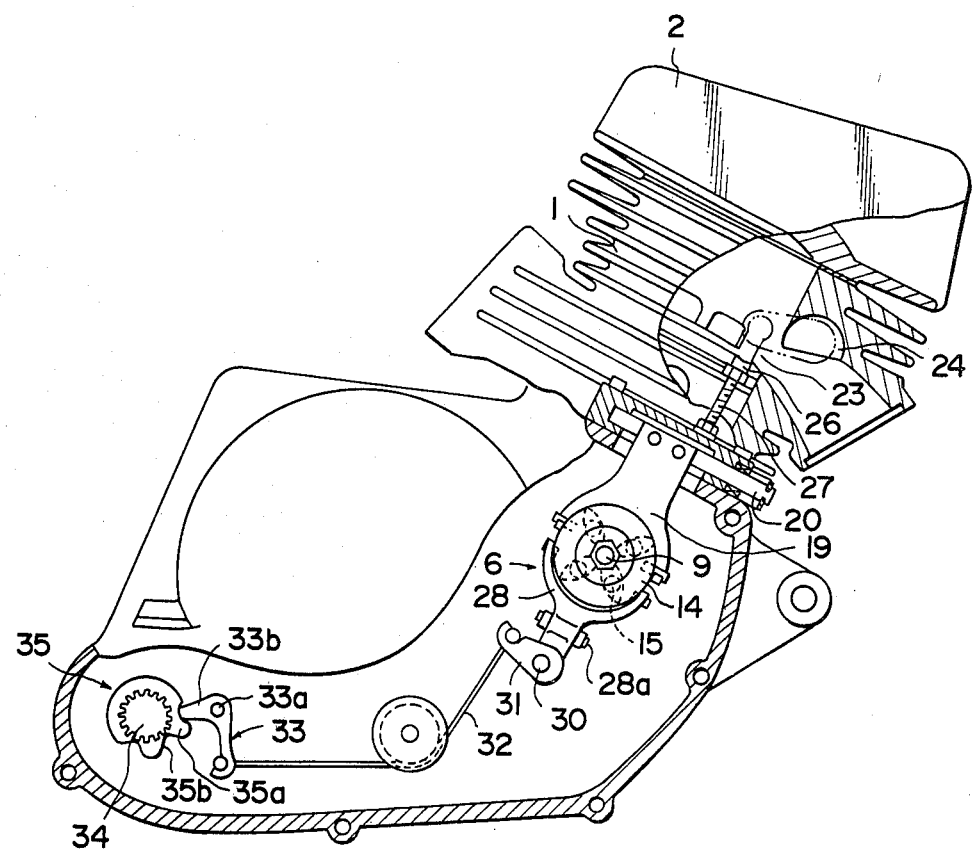

United States Patent [19]

Omote

[11] 4,397,272
[45] Aug. 9, 1983

[54] TWO STROKE ENGINE HAVING EXHAUST TIMING CONTROL VALVE MEANS

[75] Inventor: Shigenori Omote, Iwata, Japan

[73] Assignee: Yamaha Hatsudoki Kabushiki Kaisha, Iwata, Japan

[21] Appl. No.: 314,970

[22] Filed: Oct. 26, 1981

[30] Foreign Application Priority Data

Oct. 30, 1980 [JP] Japan .................................. 55-151449

[51] Int. Cl.³ ....................... F02N 17/00; F02B 75/02; F02D 9/06
[52] U.S. Cl. .............................. 123/179 A; 123/65 V; 123/65 PE; 123/179 SE; 123/179 R; 123/323; 123/340
[58] Field of Search ................ 123/65 V, 65 PE, 323, 123/340, 179 A, 179 R, 179 SE, 324

[56] References Cited

U.S. PATENT DOCUMENTS

| | | | |
|---|---|---|---|
| 4,121,552 | 10/1978 | Mithuo et al. .................. | 123/65 PE |
| 4,202,297 | 5/1980 | Oku et al. ........................ | 123/65 PE |
| 4,285,311 | 8/1981 | Iio ........................................ | 123/323 |
| 4,321,893 | 3/1982 | Yamamoto ........................... | 123/323 |
| 4,325,335 | 4/1982 | Shibata ................................ | 123/323 |
| 4,333,431 | 6/1982 | Iio et al. .............................. | 123/323 |
| 4,341,188 | 7/1982 | Nerstrom ............................. | 123/324 |
| 4,364,346 | 12/1982 | Shiohara ............................. | 123/323 |
| 4,368,703 | 1/1983 | Shibata ................................ | 123/323 |

Primary Examiner—Wendell E. Burns
Attorney, Agent, or Firm—Kerkam, Stowell, Kondracki & Clarke

[57] ABSTRACT

A two stroke engine having an exhaust port formed in the cylinder wall. At the upper portion of the exhaust port, there is provided a rotary type exhaust timing control valve which is adapted to be rotatably actuated to control the exhaust timing in accordance with the engine speed. The control valve is interconnected with the engine starting mechanism so that the control valve is forcedly driven by the starting mechanism to thereby eliminate valve seizure.

4 Claims, 2 Drawing Figures

TWO STROKE ENGINE HAVING EXHAUST TIMING CONTROL VALVE MEANS

The present invention relates to two stroke engines and more particularly to two stroke engines having valve means for controlling exhaust port timings in accordance with engine speed. More particularly, the present invention pertains to means for preventing seizures of such valve means.

Conventional two stroke engines generally include an exhaust port provided in the cylinder wall so that it is controlled by the piston as the piston reciprocates in the cylinder. It has been recognized that the exhaust port timing has an important effect on the engine performance and that the optimum exhaust timing is dependent on the engine speed. In order to provide an improved engine performance, the exhaust port timing must be advanced under a high engine speed than that under a low engine speed.

In order to meet the aforementioned requirement, there has already been proposed, by Japanese utility model application Sho 49-111838 corresponding to the U.S. patent application Ser. No. 781,429 which is a continuation of Ser. No. 612,863 and matured into U.S. Pat. No. 4,121,552, to provide a rotary valve member at the upper portion of the exhaust port. The valve member has a part-circular cross-sectional configuration and rotatable between a retracted position wherein the valve member is retracted from the exhaust port and a projected position wherein the valve member projects into the exhaust port to thereby cover the upper portion of the exhaust port so that the exhaust port timing is changed. In the U.S. Pat. application Ser. No. 916,751 filed on June 12, 1978 now U.S. Pat. No. 4,202,297 and assigned to the assignee of the present invention, there is disclosed a specific valve structure which is suitable for obtaining a reliable operation.

In order to control the rotary valve in accordance with the engine speed, a centrifugal actuating device is proposed by the U.S. Pat. application Ser. No. 61,514 filed on July 24, 1979 now U.S. Pat. No. 4,285,311. According to the proposal, the actuating device includes a driven shaft extending perpendicularly to and driven by the engine crankshaft or a countershaft provided in parallel with the crankshaft. At one end of the driven shaft, there is an actuating rod provided for axial movement with respect to the driven shaft. Between the driven shaft and the actuating rod, there is provided a centrifugal mechanism so that the axial position of the actuating rod is determined with respect to the driven shaft in accordance with the rotating speed of the driven shaft. The actuating rod is connected through an actuating lever with the rotary valve whereby the valve is actuated in accordance with the rotating speed of the driven shaft or the engine speed. The proposed mechanism is, however, complicated in structure because the driven shaft has to be supported at the opposite end portions by bearings and a worm gear mechanism or a bevel gear mechanism has to be used between the driven shaft and the engine crankshaft or the countershaft.

An improved valve actuating mechanism is proposed by the U.S. Pat. application Ser. No. 153,707 filed on May 27, 1980 now U.S. Pat. No. 4,325,335 and assigned to the same assignee of the present invention. According to the proposal, the valve actuating mechanism includes a driven shaft extending parallelly with the engine crankshaft and having one end connected with the crankshaft to be driven thereby. A centrifugal device is provided at the other end of the driven shaft and connected with the valve device so that the valve device is moved toward the projected position in response to a decrease in the engine speed. The driven shaft may be coaxial and directly connected with the crankshaft so that it is only required to support the driven shaft by a bearing at the other end portion thereof. In this arrangement, however, there is a problem in that the engine crankshaft is generally provided with a magneto for generating electricity. The magneto applies a magnetical influence to the centrifugal device to thereby cause an inaccurate operation of the centrifugal device. The U.S. Pat. application Ser. No. 223,225 filed on Jan. 7, 1981 now U.S. Pat. No. 4,368,703 and assigned to the same assignee of the present invention proposes a rotary valve actuating device which is not adversely affected by the magneto mounted on the engine crankshaft. According to the proposal, the valve actuating centrifugal device is provided on the end of the crankshaft opposite to the end where the magneto is provided.

It should however be noted that, in either of the previously proposed arrangements, there is a problem that lubricating oil is deposited on the valve surface and carbonized to form carbon deposits thereon. Such carbon deposits on the valve surface disturb smooth operations of the valve and sometimes cause valve seizure.

It is therefore an object of the present invention to provide an exhaust port timing control valve device having means for preventing seizure of the valve member.

Another object of the present invention is to provide valve means for controlling exhaust port timing of a two stroke engine with means for effectively removing carbon deposits from the valve member.

According to the present invention, the above and other objects can be accomplished by a two-stroke engine comprising cylinder means, piston means which is received in said cylinder means for reciprocating movement, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, valve actuating means for actuating the valve means between said projected and retracted positions in accordance with engine speed, engine starting means for cranking said engine for starting the same, said valve means being connected with said engine starting means so that the valve means is actuated during engine starting operation to thereby eliminate valve seizure.

Figure 2:
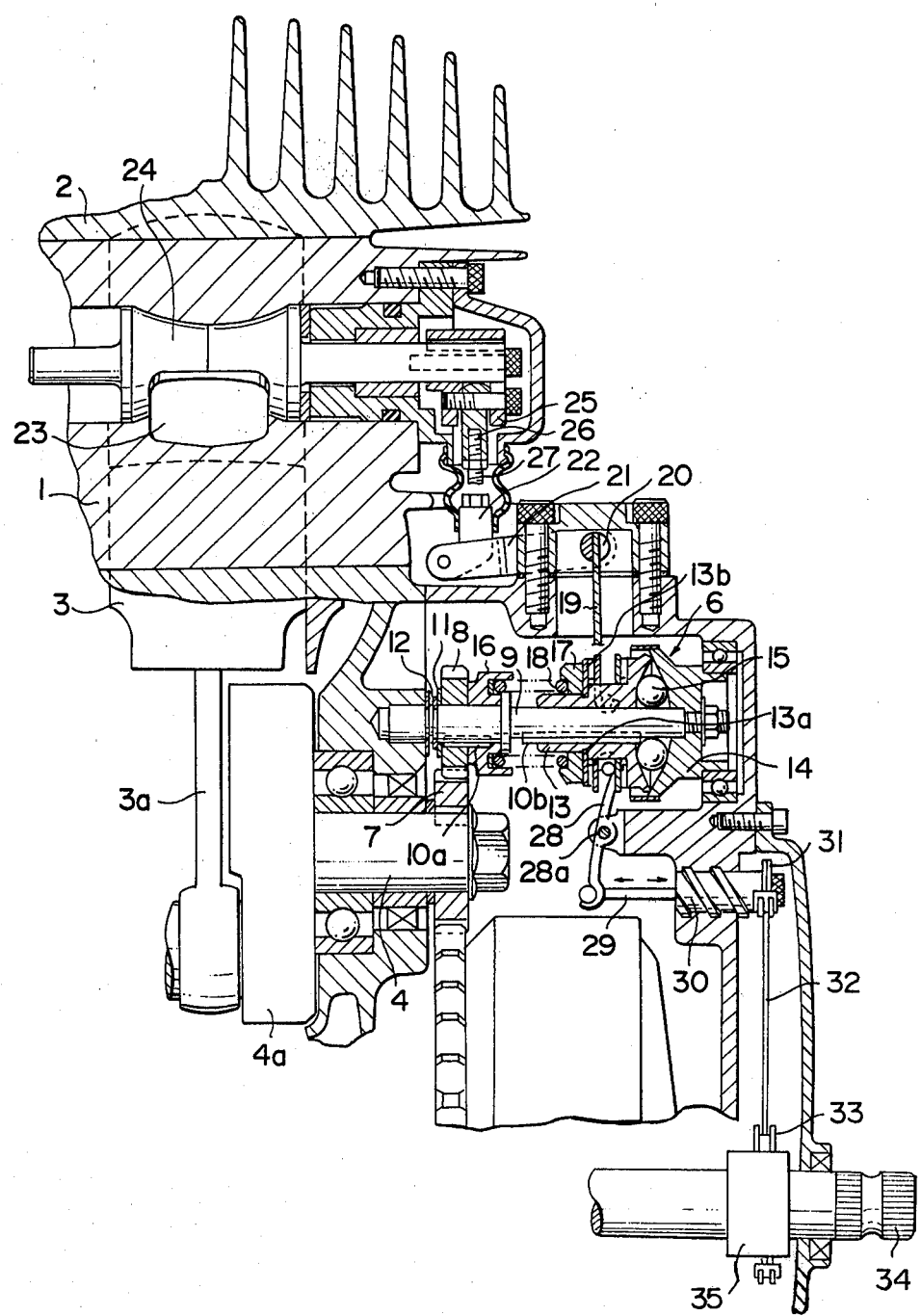

The above and other objects and features of the present invention will become apparent from the following descriptions of a preferred embodiment taking reference to the accompanying drawings, in which:

FIG. 1 is a partially sectioned side view of a two stroke engine in accordance with one embodiment of the present invention; and, FIG. 2 is an enlarged sectional view showing the interconnecting mechanism between the engine starting mechanism and the exhaust timing control valve.

Referring to the drawings, there is shown a two stroke engine including a cylinder 1 and a cylinder head 2 mounted on the upper end of the cylinder 1. In the cylinder 1, there is a piston 3 which is disposed for reciprocating movement therein and connected through a connecting rod 3a with a crankshaft 4 at the crankarm 4a thereof. The crankshaft 4 has a primary drive gear 7 secured to one end thereof and a governor drive gear 8 is engaged with the gear 7 so as to drive a governor mechanism 6.

The governor drive gear 8 is secured to a rotor shaft 9 by means of a key 10a to rotate as a unit therewith and held against axial movement by a washer 11 and a C-clip 12. The rotor shaft 9 further has a slider 13 which is held on the shaft 9 by means of a key 10b so that it rotates with the shaft 9 but is axially slidable with respect to the shaft 9. A guide plate 14 is secured to the outer end of the rotor shaft 9 so as to be opposed to the slider 13. Between the slider 13 and the guide plate 14, there are disposed a plurality of steel balls 15. On the rotor shaft 9, there are provided a pair of spring seats 16 and 18. The spring seat 6 is in contact with the governor drive gear 8 and the spring seat 17 is held against a shoulder 13a through a disc 13b. A spring 18 is provided to act between the spring seats 16 and 17 so that the slider 13 is forced under the influence of the spring 18 toward the guide plate 14. The slider 13 and the guide plate 14 are rotated together and the steel balls 15 are force radially outwardly under centrifugal force to thereby force the slider 13 axially against the action of the spring 18.

The slider 13 is engaged with one end of a shift fork 19, the other end of the shift fork 19 being secured to a shift lever 20. Thus, an axial movement of the slider 13 produces a rotation of the shift lever 20. The shift lever 20 has one end secured to a swingable lever 21 which is swingable about the axis of the shift lever 20 in response to a rotation of the shift lever 20. The lever 21 carries a swingable joint 22 at its free end.

The cylinder 1 is formed with an exhaust port 23 and an exhaust port timing control valve 24 is provided in the upper portion of the exhaust port 23. The valve 24 is provided at one end with a bracket 25 which swingably carries a joint 26. The joints 22 and 26 are connected together by an adjustable rod 27. Thus, it will be understood that the exhaust port timing control valve 24 is rotated to take an appropriate position in accordance with the engine speed.

The slider 13 is also engaged with one end of another shift fork 28 which is swingably mounted by a shaft 28a. The other end of the shift fork 28 is engaged with a spherical end of a push rod 29 which is integrally formed with a screw shaft 30. The screw shaft 30 is threadably engaged with the engine crankcase so that a rotation of the shaft 30 causes its own axial movement. The screw shaft 30 has an outer end which has an arm 31 secured thereto. An interconnecting wire 32 is engaged at its one end with the arm 31, the other end of the wire 32 being engaged with one end of a claw arm 33 which is pivotably mounted on the crankcase by a pin 33a.

The claw arm 33 is provided at the other end with a claw 33b which is adapted to be engaged with a peripheral surface of a cam 35 secured to an engine starting shaft 34. The cam 35 is formed with a plurality of alternately arranged cam lobes 35a and recesses 35b. The claw 33b on the arm 33 engages normally with one of the recesses 35b.

In operation, as the crankshaft 4 rotates, the rotor shaft 9 is rotated through the primary drive gear 7 and the governor drive gear 8 and the rotation of the rotor shaft 9 is transmitted to the slider 13 and the guide plate 14. The steel balls 15 are thus forced radially outwardly under the centrifugal force to thereby urge the slider 13 axially against the action of the spring 18. The axial movement of the slider 13 is converted through the shift fork 19 into a rotation of the shift lever 20 so that the exhaust port timing control valve 24 is rotated through the lever 21, the joint 22, the rod 27, the joint 26 and the bracket 25. Since the centrifugal force in the steel balls 15 are substantially proportional to the rotating speed of the crankshaft 4, the position of the valve 24 is determined substantially in accordance with the engine speed.

When the engine is to be started, the starting shaft 34 is rotated by an external force so that the crankshaft 4 is cranked. As the starting shaft 34 is rotated, the cam 35 is also rotated and the cam profile causes the claw arm 33 to swing. The swinging movement of the claw arm 33 is transmitted through the wire 32 and the lever 31 to the screw shaft 30 so that the screw shaft 30 and the push rod 29 are axially moved. The axial movement of the rod 29 causes the shift fork 28 to swing so that the slider 13 is axially moved to thereby rotate the exhaust control valve 24. It will therefore be understood that even if there are noticeable amount of carbon deposits on the surface of the valve 24, such carbon deposits can be scraped off by rotating the valve 24 during the starting period. Further, even if there is a seizure between the valve 24 and the cylinder 1, such seizure can be eliminated through the rotation of the valve 24 in the engine starting period. After the engine has been started, the claw 33b on the claw lever 33 is placed in one of the recesses 35b in the cam 35 so that the push rod 29 is held in the fully extended position so that the rod 29 does not disturb the operation of the governor device 6.

The invention has thus been shown and described with reference to a specific embodiment, however, it should be noted that the invention is in no way limited to the details of the illustrated structure but changes and modifications may be made without departing from the scope of the appended claims.

I claim:

1. A two-stroke engine comprising cylinder means, piston means which is received in said cylinder means for reciprocating movement, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, valve actuating means for actuating the valve means between said projected and retracted positions in accordance with engine speed, engine starting means for cranking said engine for starting the same, said valve means being connected with said engine starting means so that the valve means is actuated during engine starting operation to thereby eliminate valve seizure.

2. A two-stroke engine in accordance with claim 1 in which said valve actuating means is a centrifugal governor means including rotor shaft means rotated by engine crankshaft means, guide plate means secured to said rotor shaft means to rotate therewith, slidable plate means provided on said rotor shaft means so that it rotates with but axially slidable with respect to said rotor shaft means, biasing means for urging said slidable plate means toward said guide plate means, centrifugal weight means disposed between said guide and slidable plate means so as to be displaced radially outwardly under centrifugal force produced therein to thereby force said slidable plate means axially against the biasing means, and means for converting an axial movement of the slidable plate means into a rotation of the rotary valve means.

3. A two-stroke engine in accordance with claim 2 in which said engine starting means is an engine starting rotatable shaft which is adapted to be rotated by an external force, means being provided for transmitting a rotating movement of the starting shaft into an axial movement of the slidable plate means to thereby rotate the valve means.

4. A two-stroke engine in accordance with claim 2 in which said engine starting means is an engine starting rotatable shaft which is adapted to be rotated by an external force, said starting shaft means has cam means and cam follower means is provided to produce axial movements of said slidable plate means in response to a rotation of the starting shaft means.

* * * * *